United States Patent
Du (10) Patent No.: US 11,404,896 B2
(45) Date of Patent: Aug. 2, 2022

(54) METHOD AND DEVICE FOR CHARGING LITHIUM ION BATTERY

(71) Applicant: BEIJING XIAOMI MOBILE SOFTWARE CO., LTD., Beijing (CN)

(72) Inventor: Sihong Du, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 303 days.

(21) Appl. No.: 16/699,105

(22) Filed: Nov. 28, 2019

(65) Prior Publication Data
US 2021/0066947 A1    Mar. 4, 2021

(30) Foreign Application Priority Data
Aug. 28, 2019 (CN) .......................... 201910804036.8

(51) Int. Cl.
*H02J 7/04* (2006.01)
*H02J 7/00* (2006.01)
(Continued)

(52) U.S. Cl.
CPC ... *H02J 7/007182* (2020.01); *H01M 10/0525* (2013.01); *H01M 10/44* (2013.01)

(58) Field of Classification Search
None
See application file for complete search history.

(56) References Cited

U.S. PATENT DOCUMENTS

| | | | |
|---|---|---|---|
| 2006/0093894 A1 | 5/2006 | Scott | |
| 2011/0204850 A1* | 8/2011 | Kaino | H02J 7/0013 320/116 |

(Continued)

FOREIGN PATENT DOCUMENTS

| | | |
|---|---|---|
| CN | 101048897 A | 10/2007 |
| CN | 104269583 A | 1/2015 |

(Continued)

OTHER PUBLICATIONS

First Office Action of the Chinese application No. 201910804036.8, dated Sep. 1, 2021.
(Continued)

*Primary Examiner* — Arun C Williams
(74) *Attorney, Agent, or Firm* — Syncoda LLC; Feng Ma (57) ABSTRACT

A method for charging a lithium ion battery includes: acquiring a polarization attribute of the lithium ion battery, the polarization attribute including a maximum charging current under which no lithium plating occurs at an anode of the lithium ion battery; determining, according to the polarization attribute, multiple sections of constant charging currents which have current values decreasing sequentially in a sectional charging sequence; charging the lithium ion battery in sections with the multiple sections of constant charging currents respectively, and after charging in each section, leaving the lithium ion battery standing or discharging the lithium ion battery with a preset discharging current less than the maximum charging current; and performing constant-voltage charging with taking a constant-current cut-off voltage as a constant voltage when a voltage of the lithium ion battery reaches the constant-current cut-off voltage.

20 Claims, 4 Drawing Sheets

(51) Int. Cl.
*H01M 10/0525* (2010.01)
*H01M 10/44* (2006.01)

(56) References Cited

U.S. PATENT DOCUMENTS

| | | |
|---|---|---|
| 2016/0118818 A1 | 4/2016 | Yamauchi |
| 2017/0244255 A1 | 8/2017 | Luo et al. |

FOREIGN PATENT DOCUMENTS

| | | |
|---|---|---|
| CN | 106099230 A | 11/2016 |
| CN | 106129508 A | 11/2016 |
| CN | 107104249 A | 8/2017 |
| CN | 107706471 A | 2/2018 |
| CN | 108235791 A | 6/2018 |
| CN | 109004694 A | 12/2018 |
| CN | 110061315 A | 7/2019 |
| EP | 2239804 A2 | 10/2010 |
| EP | 3211709 A1 | 8/2017 |
| JP | H0521093 A | 1/1993 |
| JP | 2012003863 A | 1/2012 |
| WO | 2017128724 A1 | 8/2017 |

OTHER PUBLICATIONS

Supplementary European Search Report in the European application No. 19214656.1, dated Jun. 19, 2020.
Notice of Allowance of the Chinese application No. 201910804036.8, dated May 27, 2022.

\* cited by examiner

FIG. 1

S210: A polarization attribute of a lithium ion battery is acquired, the polarization attribute includes a maximum charging current under which no lithium plating occurs at an anode of the lithium ion battery S220: Current values of multiple sections of constant charging currents, which decrease sequentially in a sectional charging sequence, are determined according to the polarization attribute, the current value of the first section of constant charging current in the multiple sections of constant charging currents for charging the lithium ion battery ranges from 1.1 times to 2.0 times of a current value of the maximum charging current S230: Multiple sections of anode lithium plating potentials of the lithium ion battery, which have one-to-one correspondences with the current values of the multiple sections of constant charging currents, are determined based on the current values of the multiple sections of constant charging currents S240: Under a condition that a potential of the lithium ion battery during charging in each section is less than an anode lithium plating potential in the section, a charging time for charging in each section is determined according to the polarization attribute S250: The lithium ion battery is charged in sections with the multiple sections of constant charging currents, and after being charged in each section, the lithium ion battery is left standing, or the lithium ion battery is discharged with a preset discharging current less than the maximum charging current S260: When a voltage of the lithium ion battery reaches a constant-current cut-off voltage, constant-voltage charging is performed with taking the constant-current cut-off voltage as a constant voltage

METHOD AND DEVICE FOR CHARGING LITHIUM ION BATTERY

CROSS-REFERENCE TO RELATED APPLICATION

This application claims the priority to Chinese patent application No. 201910804036.8 filed on Aug. 28, 2019, the disclosure of which is hereby incorporated by reference in its entirety.

BACKGROUND

With the development of battery technologies, lithium ion batteries are extensively applied to mobile terminals such as mobile phones and tablets currently due to high power, long battery life, lightweight, low cost and high safety thereof. However, on one hand, a lithium plating phenomenon may occur to an anode in a charging process of a lithium ion battery, which affects safety of the lithium ion battery and shorten service life. Therefore, a method for safely charging a lithium ion battery is needed. On the other hand, it takes several hours for charging a lithium ion battery, and the long charging time results in inconvenience to a user. Therefore, there is an increasingly urgent need for rapidly charging a lithium ion battery.

SUMMARY

The present disclosure generally relates to the technical field of batteries, and more specifically to a method for charging a lithium ion battery and a device for charging a lithium ion battery.

According to a first aspect of the present disclosure, a method for charging a lithium ion battery is provided, which include operations as follows. A polarization attribute of the lithium ion battery is acquired. The polarization attribute includes a maximum charging current under which no lithium plating occurs at an anode of the lithium ion battery. Multiple sections of constant charging currents which have current values decreasing sequentially in a sectional charging sequence are determined according to the polarization attribute. The lithium ion battery is charged in sections with the multiple sections of constant charging currents. After being charged in each section, the lithium ion battery is left standing or the lithium ion battery is discharged with a preset discharging current less than the maximum charging current. Constant-voltage charging is performed with taking a constant-current cut-off voltage as a constant voltage when a voltage of the lithium ion battery reaches the constant-current cut-off voltage.

According to a second aspect of the present disclosure, a device for charging a lithium ion battery is provided, which includes: a processor, and a memory configured to store an instruction executable by the processor. The processor is configured to: acquire a polarization attribute of a lithium ion battery, where the polarization attribute includes a maximum charging current under which no lithium plating occurs at an anode of the lithium ion battery; determine, according to the polarization attribute, multiple sections of constant charging currents which have current values sequentially decreasing in a sectional charging sequence; charge the lithium ion battery in sections with the multiple sections of constant charging currents respectively and, after charging in each section, leave the lithium ion battery standing or discharge the lithium ion battery with a preset discharging current less than the maximum charging current; and perform constant-voltage charging with taking a constant-current cut-off voltage as a constant voltage when a voltage of the lithium ion battery reaches the constant-current cut-off voltage.

According to a third aspect of the present disclosure, a non-transitory computer-readable storage medium is provided, which has a computer-executable instruction stored thereon for execution by a processor to implement any method in the abovementioned methods. The method includes operations as follows. A polarization attribute of the lithium ion battery is acquired. The polarization attribute includes a maximum charging current under which no lithium plating occurs at an anode of the lithium ion battery. Multiple sections of constant charging currents which have current values decreasing sequentially in a sectional charging sequence are determined according to the polarization attribute. The lithium ion battery is charged in sections with the multiple sections of constant charging currents. After being charged in each section, the lithium ion battery is left standing or the lithium ion battery is discharged with a preset discharging current less than the maximum charging current. Constant-voltage charging is performed with taking a constant-current cut-off voltage as a constant voltage when a voltage of the lithium ion battery reaches the constant-current cut-off voltage.

It is to be understood that the above general descriptions and following detailed descriptions are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

FIG. 2 is a flowchart of a method for charging a lithium ion battery according to some embodiments of the present disclosure.

DETAILED DESCRIPTION

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

A lithium ion battery in the technical solutions of some embodiments of the present disclosure includes, but is not limited to, a lithium-cobalt ion battery, a lithium iron phosphate ion battery, a lithium manganate ion battery, a Nickel-Cobalt-Manganese (NCM) (ternary) lithium ion battery and the like. The technical solutions of some embodiments of present disclosure may be applied to various types of lithium ion batteries.

The lithium ion battery in some embodiments of the present disclosure may be applied to a terminal. The terminal may be a mobile terminal and may also be called User Equipment (UE), a Mobile Station (MS) and the like. The terminal may be a device providing a voice and/or data connection for a user or a chip arranged in the device, for example, a handheld device with a wireless connection function and a vehicle-mounted device. For example, examples of the terminal may include a mobile phone, a tablet computer, a notebook computer, a palm computer, a Mobile Internet Device (MID), a wearable device, a Virtual Reality (VR) device, an Augmented Reality (AR) device, a wireless terminal for industrial control, a wireless terminal for unmanned driving, a wireless terminal for a remote surgery, a wireless terminal in a smart grid, a wireless terminal for transportation safety, a wireless terminal in smart city, a wireless terminal in smart home and the like, however, the present disclosure is not limited thereto.

The technical solutions provided in the present disclosure are described below in detail.

Figure 1:
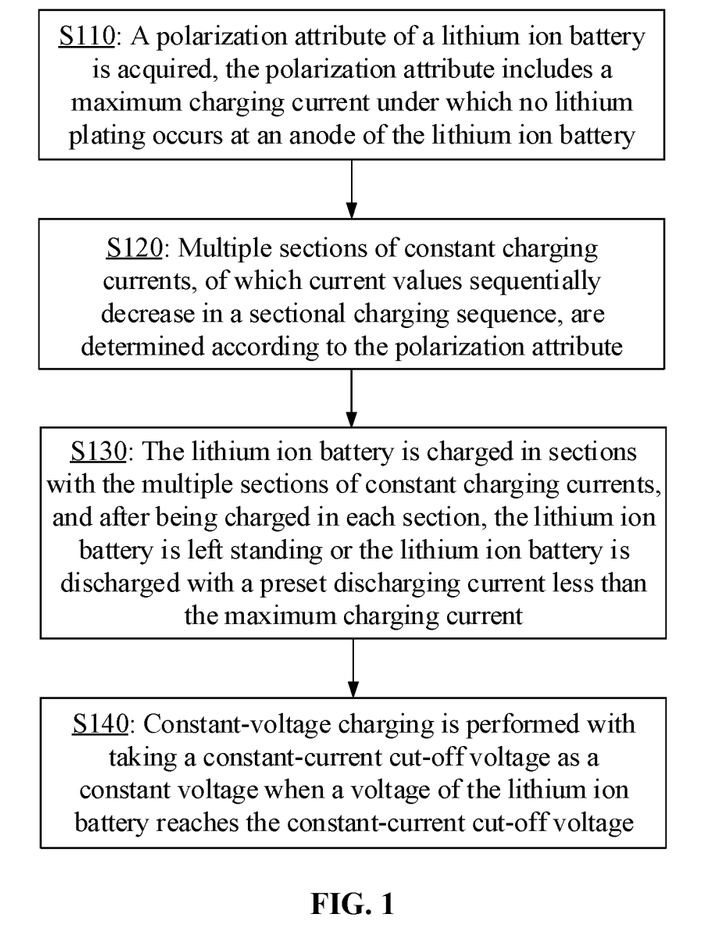
FIG. 1 is a flowchart of a method for charging a lithium ion battery according to some embodiments of the present disclosure.

FIG. 1 is a flowchart showing a method for charging a lithium ion battery, according to some embodiments of the present disclosure. Referring to FIG. 1, the method for charging the lithium ion battery includes operations S110 to S140.

In operation 110, a polarization attribute of a lithium ion battery is acquired. The polarization attribute includes a maximum charging current under which no lithium plating occurs at an anode of the lithium ion battery.

In some embodiments, a phenomenon that a potential is deviated from an equilibrium potential when a current flows through the lithium ion battery is called polarization of the battery. An over-potential is a difference value between the actual potential and the equilibrium potential, and is used to measure a polarization degree.

In some embodiments, the polarization attribute of the lithium ion battery may include the maximum charging current under which no lithium plating occurs at an anode of the lithium ion battery, a minimum anode potential under which no lithium plating occurs at an anode of the lithium ion battery and the like, but the present disclosure is not limited thereto. The polarization attribute of the lithium ion battery may include any parameter or value capable of representing the polarization degree of the lithium ion battery.

In operation S120, multiple sections of constant charging currents which have current values decreasing sequentially in a sectional charging sequence are determined according to the polarization attribute.

In some embodiments, the multiple sections of constant charging currents may be determined according to the maximum charging current under which no lithium plating occurs at an anode of the lithium ion battery. The multiple sections of constant charging currents may be a pulse current in a certain time period, and a current value of the pulse current remains unchanged.

In some embodiments, the current values of the multiple sections of constant charging currents may decrease sequentially in a charging sequence according to the polarization attribute. The current values of the multiple sections of constant charging currents may decrease linearly, but the present disclosure is not limited thereto. Alternately, the current values of the multiple sections of constant charging currents may decrease nonlinearly. In an example, the current values of the multiple sections of constant charging currents may decrease in a mathematically monotonic manner, but the present disclosure is not limited thereto. The current values of the multiple sections of constant charging currents may decrease in any suitable manner according to the polarization attribute of the lithium ion battery.

In operation S130, the lithium ion battery is charged in sections with the multiple sections of constant charging currents. After being charged in each section, the lithium ion battery is left standing, or the lithium ion battery is discharged with a preset discharging current less than the maximum charging current.

In some embodiments, after the lithium ion battery is charged in each section, the lithium ion battery is left standing.

In some embodiments, a time period for leaving standing may range from 0.1 second to 500 seconds.

In some embodiments, time periods for leaving standing after charging in sections may be equal and may also be unequal.

The lithium ion battery is left standing for a short time period after being charged with a high current pulse, thereby avoiding an increase in a lithium ion concentration of an anode surface caused by the high current pulse, and further avoiding occurrence of a lithium plating phenomenon.

In some embodiments, after the lithium ion battery is charged in each section, the lithium ion battery is discharged with a discharging current less than the maximum charging current.

In some embodiments, the discharging currents may be equal, however, which is only an example and is not intended to limit the present disclosure. In the example, the discharging currents may also be unequal.

In some embodiments, a discharging time may range from 0.1 second to 500 seconds, however, which is only an example and is not intended to limit the present disclosure. Any suitable discharging time may be used.

In some embodiments, the discharging time after charging in sections may be equal and may also be unequal.

The lithium ion battery is discharged with a low current pulse after being charged with the high current pulse, thereby avoiding an increase in a lithium ion concentration of an anode surface caused by the high current pulse, and further avoiding occurrence of a lithium plating phenomenon.

In operation S140, when a voltage of the lithium ion battery reaches a constant-current cut-off voltage, constant-voltage charging is performed with taking the constant-current cut-off voltage as a constant voltage.

In some embodiments, the constant-current cut-off voltage may be a maximum operation voltage of the lithium ion battery. The maximum operation voltage is determined according to a system, the type or capacity of the lithium ion battery. When the voltage of the lithium ion battery reaches the constant-current cut-off voltage, the constant-current charging stage ends, and the constant-current charging stage starts.

In some embodiments of the present disclosure, in a constant-current charging stage, the lithium ion battery is charged with the multiple sections of constant-current charging currents which have the current values decreasing sequentially, and the lithium ion battery is left standing or discharged after charging in each section. In a constant-voltage charging stage, the lithium ion battery is charged with a charging current obtained when the voltage of the lithium ion battery reaches the constant-current cut-off voltage while keeping at the constant-current cut-off voltage, thereby reducing polarization of the battery, effectively reducing the constant charging current entering the constant-voltage stage, and further effectively reducing a charging time for the constant-voltage stage. Since a ratio of the charging time for the constant-voltage stage to a charging time for full charging is far greater than that of a charging time for the constant-current stage to the charging time for full charging, the charging time for full charging of the lithium ion battery can be effectively reduced.

FIG. 2 is a flowchart of a method for charging a lithium ion battery, according to some embodiments of the present disclosure. Referring to FIG. 2, the method for charging a lithium ion battery includes operations S210 to S260.

In operation S210, a polarization attribute of a lithium ion battery is acquired. The polarization attribute includes a maximum charging current under which no lithium plating occurs at an anode of the lithium ion battery.

In operation S220, current values of multiple sections of constant charging currents, which decrease sequentially in a sectional charging sequence, are determined according to the polarization attribute. The current value of the first section of constant charging current in the multiple sections of constant charging currents for charging the lithium ion battery ranges from 1.1 times to 2.0 times of a current value of the maximum charging current.

In some embodiments, the current value of the first section of constant charging current may be determined according to the polarization attribute of the lithium ion battery. In an example, when a polarization degree of the lithium ion battery is low, the lithium ion battery may be charged with a high constant charging current. When the polarization degree of the lithium ion battery is high, the lithium ion battery may be charged with a low constant charging current.

In some embodiments, the current value of the first section of constant charging current may range from 1.1 times to 2.0 times of the maximum charging current under which no lithium plating occurs at an anode of the lithium ion battery, however, which is only an example and is not intended to limit the present disclosure. Any suitable value may be selected as the current value of the first section of constant charging current for charging the lithium ion battery.

In some embodiments, the current value of the first section of constant charging current may be greater than the maximum charging current, and the subsequent sections of constant charging currents may decrease quickly, thereby effectively reducing the constant charging current entering a constant-voltage stage, and further effectively reducing a charging time for the constant-voltage stage, and reducing a charging time for full charging.

In operation S230, multiple sections of anode lithium plating potentials of the lithium ion battery, which have one-to-one correspondences with the current values of the multiple sections of constant charging currents, are determined based on the current values of the multiple sections of constant charging currents.

In some embodiments, when a lithium ion battery is charged with a constant charging current, the greater the polarization degree of the lithium ion battery is, the time taken by the anode of the lithium ion battery to enter a lithium plating potential is shorter. When the lithium plating occurs at the anode, the battery may be damaged, and safety and service life of the battery may be reduced.

In operation S240, under a condition that a potential of the lithium ion battery during charging in each section is less than the anode lithium plating potential of the section, a charging time for charging in the section is determined according to the polarization attribute.

In some embodiments, the lithium ion battery is charged with different constant charging currents, anode lithium plating potentials of the lithium ion battery may be different. After a constant charging current is determined, an anode lithium plating potential corresponding to the constant charging current is correspondingly determined, and a charging time for charging with the constant charging current is further determined. Therefore, the current value and the charging time of each constant charging current may be determined.

In operation S250, the lithium ion battery is charged in sections with the multiple sections of constant charging currents. After being charged in each section, the lithium ion battery is left standing, or the lithium ion battery is discharged with a preset discharging current less than the maximum charging current.

In operation S260, when a voltage of the lithium ion battery reaches a constant-current cut-off voltage, constant-voltage charging is performed with taking the constant-current cut-off voltage as a constant voltage.

In some embodiments of the present disclosure, the anode lithium plating potentials of the lithium ion battery may be different when the lithium ion battery is charged with different constant charging currents. After a constant charging current is determined, the anode lithium plating potential corresponding to the constant charging current is determined under the circumstance that no lithium plating occurs at an anode of the lithium ion battery, and a charging time for charging with the constant charging current may further be determined. Therefore, multiple sections of safe charging voltages and charging currents of the pulse for the lithium ion battery are controlled, to effectively reduce a risk of lithium plating of the lithium ion battery, and further improve safety performance and service life of the lithium ion battery.

In some embodiments, the operation that constant-voltage charging is performed with taking the constant-current cut-off voltage as the constant voltage when the voltage of the lithium ion battery reaches the constant-current cut-off voltage includes an operation as follows. When the voltage of the lithium ion battery reaches the constant-current cut-off voltage, the lithium ion battery is charged with taking a charging current obtained when the voltage of the lithium ion battery reaches the constant-current cut-off voltage as an initial charging current for constant-voltage charging while keeping at the constant-current cut-off voltage, until the charging current for constant-voltage charging reaches a cut-off current.

In some embodiments, the cut-off current may be determined according to the capacity of the lithium ion battery. In a case of the same charging capacity, the cut-off current of the constant-voltage charging stage is increased to greatly shorten a time for the constant-voltage charging.

In some embodiments, the current values of the multiple sections of constant charging currents are determined according to a formula $I_i = A \times I_{i-1}$, where i represents a serial number for charging the lithium ion battery in sections, i is a natural number greater than 1, $I_i$ represents a current value of the i-th section of the constant charging current in the multiple sections of constant charging currents, the coefficient A is a variable less than 1 and greater than 0.2, and the coefficient A is determined according to the polarization attribute.

In some embodiments, the lithium ion battery includes a maximum operation voltage, and the constant-current cut-off voltage is a sum of the maximum operation voltage and an incremental voltage. The incremental voltage ranges from 0.01V to 0.1V.

In some embodiments, the constant-current cut-off voltage is the sum of the maximum operation voltage of the lithium ion battery and the incremental voltage. The maximum operation voltage is determined by the system, the type or capacity of the lithium ion battery, and is, for example, 4.4 volts, 4.3 volts and 4.35 volts.

In some embodiments, the incremental voltage is also called A voltage, and the incremental voltage may range from 0.01V to 0.1V. For example, the incremental voltage may be 0.05V, however, which is only an example and is not intended to limit the present disclosure. Any suitable value may be selected as the incremental voltage. The constant-current cut-off voltage may be increased to further shorten the charging time for full charging.

In some embodiments, the coefficient A is determined according to the polarization attribute.

In some embodiments, the coefficient A may be greater than or equal to 0.2 and less than 1.0. For example, the coefficient A may be greater than or equal to 0.4 and less than 1.0, however, which is only an example and is not intended to limit the present disclosure. Any suitable value may be selected as the coefficient A.

In some embodiments, the method for charging the lithium ion battery may be executed at a temperature of 25±3° C., however, which is only an example and is not intended to limit the present disclosure. The method for charging the lithium ion battery may also be executed at any proper temperature.

Experimental embodiment 1 of the present disclosure will be described below with reference to contrast example 1.

Contrast Example 1

A lithium ion battery, of which a type is 406687, the capacity is 3900 mAh and a rated voltage is 4.4V, is selected for a charging experiment.

Charging steps are described as follows.

(1) The lithium ion battery is charged with a constant current of 1.5C to reach the rated voltage of 4.4V, a charging time is about 28 minutes.

(2) Constant-voltage charging is performed while keeping at the rated voltage of 4.4V to reach 0.02C, a charging time is about 99 minutes.

A total charging time is about 127 minutes.

Experiment Embodiment 1

A lithium ion battery, of which a type is 406687, the capacity is 3900 mAh and a rated voltage is 4.4V, is selected for a charging experiment.

Before the experiment, it is confirmed that no lithium plating occurs in the battery of this type system when the battery is charged with a direct current of 1.5C, a maximum charging current of 1.7C is supported and a lithium plating voltage is 4.2V.

Charging steps are described as follows.

(1) The lithium ion battery is charged with a constant current of 1.7C to reach a voltage of 4.15V, a charging time is about 4.2 minutes.

(2) The lithium ion battery is discharged with 39 mAh for 5 seconds.

(3) The lithium ion battery is charged with a constant current of 1.5C to reach a voltage of 4.4V, a charging time is about 20.6 minutes.

(4) The lithium ion battery is discharged with 39 mAh for 5 seconds.

(5) The lithium ion battery is charged with a constant current of 0.6C to reach 4.45V, a charging time is about 1.5 minutes.

(6) The lithium ion battery is discharged with 39 mAh for 5 seconds.

(7) Constant-voltage charging is performed while keeping at the rated voltage of 4.45V to reach 390 mA (0.1C), a charging time is about 43 minutes.

A total charging time is about 69.75 minutes.

As compared with the charging method in contrast example 1, with the method for stepwise charging with multiple sections of pulses in experimental embodiment 1, the lithium ion battery is charged continuously to reach 4.15V with a charging current greater than a charging current of direct charging for the system, the lithium ion battery is charged to reach 4.4V with the current of 1.5V, and reverse discharging control is performed. As compared with the contrast example in which the lithium ion battery is directed charged with 1.5C to reach 4.4V, time for constant-current charging is greatly reduced in experimental embodiment 1. In addition, in experimental embodiment 1, the charging cut-off voltage is increased to 4.45V, and the constant-voltage charging cut-off current is increased to 0.1C, thereby greatly reducing the constant-voltage charging time.

Therefore, after the two solutions are compared, about 57 minutes are saved for charging time for full charging in experimental embodiment 1.

In addition, experimental embodiment 2 of the present disclosure will be described below with reference to contrast example 2.

Contrast Example 2

A lithium ion battery, of which a type is 344087, the capacity is 1860 mAh and a rated voltage is 4.4V, is selected for a charging experiment.

Charging steps are described as follows.

(1) The lithium ion battery is charged with a constant current of 3.0C to reach the rated voltage of 4.4V, charging time is about 13 minutes.

(2) Constant-voltage charging is performed to reach 0.02C while keeping at the rated voltage of 4.4V, a charging time is about 60 minutes.

A total charging time is about 73 minutes.

Experiment Embodiment 2

A lithium ion battery, of which a type is 334087, the capacity is 1,800 mAh and a rated voltage is 4.4V, is selected for a charging experiment.

Before the experiment, it is confirmed that no lithium plating occurs in the battery of this type system when the battery is charged with a direct current of 3.0C, a maximum charging current of 3.3C is supported and a lithium plating voltage is 4.2V.

Charging steps are described as follows.

(1) The lithium ion battery is charged with a constant current of 3.3C to reach a voltage of 4.15V, a charging time is about 2.2 minutes.

(2) The lithium ion battery is discharged with 20 mAh for 5 seconds.

(3) The lithium ion battery is charged with a constant current of 3.0C to reach a voltage of 4.4V, a charging time is about 9.4 minutes.

(4) The lithium ion battery is discharged with 20 mAh for 5 seconds.

(5) The lithium ion battery is charged with a constant current of 1.5C to reach 4.45V, a charging time is about 1 minutes.

(6) The lithium ion battery is discharged with 20 mAh for 5 seconds.

(7) Constant-voltage charging is performed to reach 216 mA (0.12C) while keeping at the rated voltage of 4.45V, a charging time is about 26.2 minutes.

A total charging time is about 39 minutes.

As compared with the charging method in contrast example 2, about 34 minutes are saved for charging time for full charging with the method for stepwise charging with multiple sections of pulses in experimental embodiment 2.

Therefore, after the two groups of contrast examples and experimental embodiments are compared, it can be seen that, with the method for charging the lithium ion battery of the present disclosure, the charging time for full charging of the lithium ion battery may be significantly reduced.

Figure 3:
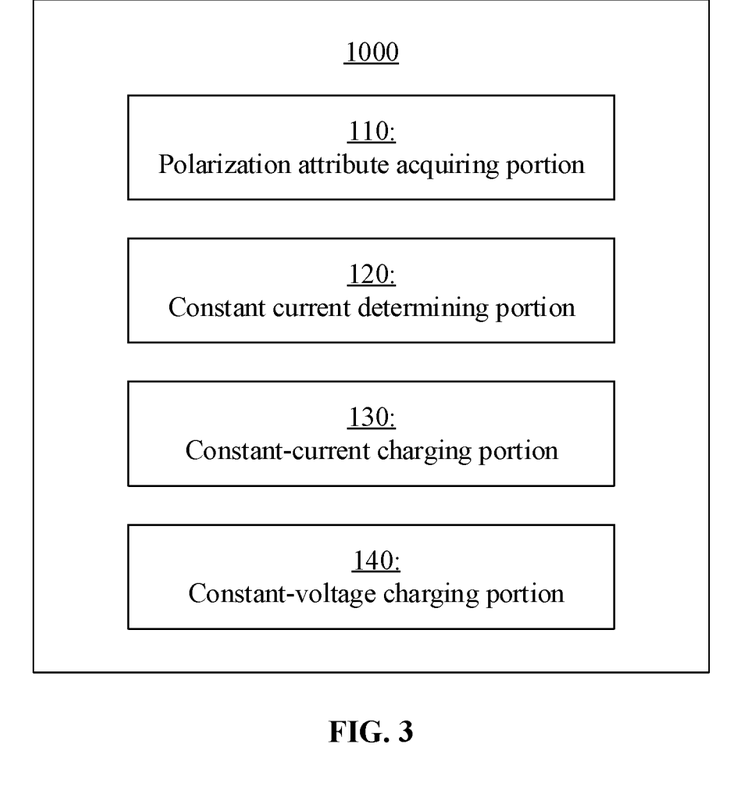
FIG. 3 is a block diagram of a device for charging a lithium ion battery according to some embodiments of the present disclosure.

FIG. 3 is a block diagram of a device for charging a lithium ion battery, according to some embodiments of the present disclosure.

In FIG. 3, the device 1000 for charging a lithium ion battery includes: a polarization attribute acquiring portion 110, a constant current determining portion 120, a constant-current charging portion 130 and a constant-voltage charging portion 140. The polarization attribute acquiring portion 110 is configured to acquire a polarization attribute of a lithium ion battery. The polarization attribute includes a maximum charging current under which no lithium plating occurs at an anode of the lithium ion battery. The constant current determining portion 120 is configured to determine multiple sections of constant charging currents which have current values decreasing sequentially in a sectional charging sequence, according to the polarization attribute. The constant-current charging portion 130 is configured to charge the lithium ion battery in sections with the multiple sections of constant charging current. After being charged in each section, the lithium ion battery is left standing, or the lithium ion battery is discharged with a preset discharging current less than the maximum charging current. The constant-voltage charging portion 140 is configured to, when a voltage of the lithium ion battery reaches a constant-current cut-off voltage, perform constant-voltage charging with taking the constant-current cut-off voltage as a constant voltage.

In some embodiments of the present disclosure, in a constant-current charging stage, the lithium ion battery is charged with the multiple sections of constant charging currents which have the current values sequentially decreasing, and the lithium ion battery is left standing or discharged after charging in each section. Then, constant-voltage charging is performed, thereby reducing polarization of the battery, and effectively reducing the constant charging current entering a constant-voltage stage, and further effectively reducing a charging time for the constant-voltage stage. Therefore, the charging time for full charging for the lithium ion battery can be effectively reduced.

In some embodiments, the constant-voltage charging portion is further configured to, when the voltage of the lithium ion battery reaches the constant-current cut-off voltage, charge the lithium ion battery with taking a charging current obtained when the voltage of the lithium ion battery reaches the constant-current cut-off voltage as an initial charging current for constant-voltage charging while keeping at the constant-current cut-off voltage, until the charging current for constant-voltage charging reaches a cut-off current.

In some embodiments, the constant current determining portion is further configured to determine the current values of the multiple sections of constant charging currents which sequentially decrease in the sectional charging sequence according to the polarization attribute. The current value of the first section of constant charging current in the multiple sections of constant charging currents for charging the lithium ion battery ranges from 1.1 times to 2.0 times of a current value of the maximum charging current. The constant current determining portion is further configured to determine multiple sections of anode lithium plating potentials of the lithium ion battery, which have one-to-one correspondences with the current values of the multiple sections of constant charging currents based on the current values of the multiple sections of constant charging currents, and, under a condition that a potential reached by the lithium ion battery during charging in each section is less than the anode lithium plating potential in the section, determine a charging time for charging in the section according to the polarization attribute.

In some embodiments, the current values of the multiple sections of constant charging currents are determined according to a formula $I_i = A \times I_{i-1}$, where i represents a serial number for charging the lithium ion battery in sections, i is a natural number greater than 1, $I_i$ represents a current value of the i-th section of the constant charging current in the multiple sections of constant charging currents, the coefficient A is a variable less than 1 and greater than 0.2, and the coefficient A is determined according to the polarization attribute.

In some embodiments, the lithium ion battery includes a maximum operation voltage, and the constant-current cut-off voltage is a sum of the maximum operation voltage and an incremental voltage. The incremental voltage ranges from 0.01V to 0.1V.

In addition, the present disclosure also provides a non-transitory computer-readable storage medium, which has a computer-executable instruction stored thereon. The computer-executable instruction, when being executed by a processor, executes the method in each of the embodiments.

Moreover, the present disclosure also provides an electronic device, which includes: a memory, configured to store an instruction; and a processor, configured to call the instruction to execute the method in each of the embodiments.

Figure 4:
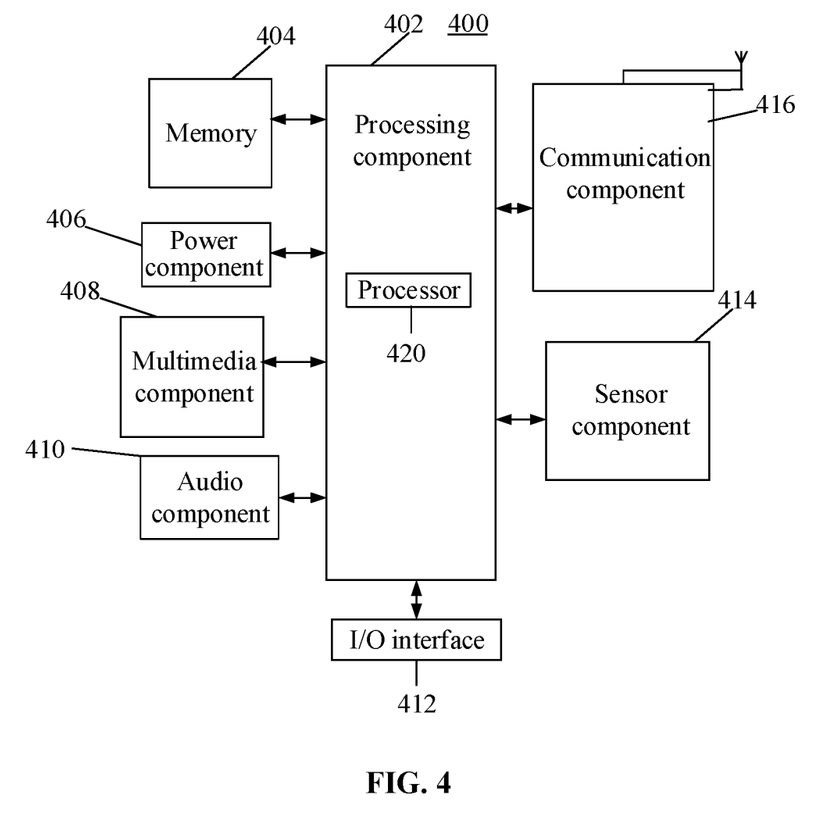
FIG. 4 is a block diagram of a device 400 according to some embodiments of the present disclosure.

FIG. 4 is a block diagram of a device 400, according to some embodiments of the present disclosure. For example, the device 400 may be provided as a terminal, and a lithium ion battery in the present disclosure may be applied to the terminal. For example, the device 400 may be a mobile phone, a computer, a digital broadcast terminal, a messaging device, a gaming console, a tablet, a medical device, exercise equipment and a personal digital assistant, an intelligent cleaning device, a sweeping robot and the like.

Referring to FIG. 4, the device 400 may include one or more of the following components: a processing component 402, a memory 404, a power component 406, a multimedia component 408, an audio component 410, an Input/Output (I/O) interface 412, a sensor component 414, and a communication component 416.

The processing component 402 is typically configured to control overall operations of the device 400, such as the operations associated with display, telephone calls, data communications, camera operations, and recording operations. The processing component 402 may include one or more processors 420 to execute instructions to perform all or part of the operations in the abovementioned method. Moreover, the processing component 402 may include one or more portions which facilitate interaction between the processing component 402 and other components. For instance, the processing component 402 may include a multimedia portion to facilitate interaction between the multimedia component 408 and the processing component 402.

The memory 404 is configured to store various types of data to support the operation of the device 400. Examples of such data include instructions for any application programs or methods operated on the terminal 400, contact data, phonebook data, messages, pictures, video, etc. The memory 404 may be implemented by any type of volatile or nonvolatile memory devices, or a combination thereof, such as an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 406 is configured to provide power for various components of the terminal 400. The power component 406 may include a power management system, one or more power supplies, and other components associated with generation, management and distribution of power for the terminal 400.

The multimedia component 408 may include a screen for providing an output interface between the terminal 400 and a user. In some examples, the screen may include a Liquid Crystal Display (LCD) and a Touch Panel (TP). In some embodiments, organic light-emitting diode (OLED) or other types of displays can be employed. If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some examples, the multimedia component 408 may include a front camera and/or a rear camera. The front camera and/or the rear camera may receive external multimedia data when the device 400 is in an operation mode, such as a photographing mode or a video mode. Each of the front camera and the rear camera may be a fixed optical lens system or have focusing and optical zooming capabilities.

The audio component 410 is configured to output and/or input an audio signal. For example, the audio component 410 includes a Microphone (MIC), and the MIC is configured to receive an external audio signal when the terminal 400 is in the operation mode, such as a call mode, a recording mode and a voice recognition mode. The received audio signal may further be stored in the memory 404 or transmitted through the communication component 416. In some examples, the audio component 410 may further include a speaker configured to output the audio signal.

The I/O interface 412 is configured to provide an interface between the processing component 402 and a peripheral interface portion, and the peripheral interface portion may be a keyboard, a click wheel, a button and the like. The button may include, but not limited to: a home button, a volume button, a starting button and a locking button.

The sensor component 414 may include one or more sensors configured to provide status assessment in various aspects for the device 400. For instance, the sensor component 414 may detect an on/off status of the device 400 and relative positioning of components, such as a display and small keyboard of the device 400, and the sensor component 414 may further detect a change in a position of the device 400 or a component of the terminal 400, presence or absence of contact between the user and the device 400, orientation or acceleration/deceleration of the device 400 and a change in temperature of the device 400. The sensor component 414 may include a proximity sensor configured to detect presence of an object nearby without any physical contact. The sensor component 414 may also include a light sensor, such as a Complementary Metal Oxide Semiconductor (CMOS) or Charge Coupled Device (CCD) image sensor, configured for use in an imaging APP. In some examples, the sensor component 414 may also include an acceleration sensor, a gyroscope sensor, a magnetic sensor, a pressure sensor or a temperature sensor.

The communication component 416 is configured to facilitate wired or wireless communication between the device 400 and other equipment. The device 400 may access a communication-standard-based wireless network, such as a Wireless Fidelity (Wi-Fi) network, a $2^{nd}$-Generation (2G), $3^{rd}$-Generation (3G), $4^{th}$-Generation (4G), or $5^{th}$-Generation (5G) network or a combination thereof. In some embodiments of the present disclosure, the communication component 416 is configured to receive a broadcast signal or broadcast associated information from an external broadcast management system through a broadcast channel. In some embodiments of the present disclosure, the communication component 416 may further include a Near Field Communication (NFC) portion to facilitate short-range communication. For example, the NFC portion may be implemented based on a Radio Frequency Identification (RFID) technology, an Infrared Data Association (IrDA) technology, an Ultra-WideBand (UWB) technology, a Bluetooth (BT) technology and another technology.

In some embodiments of the present disclosure, the device 400 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments of the present disclosure, there is also provided a non-transitory computer-readable storage medium including an instruction, such as the memory 404 including an instruction, and the instruction may be executed by the processor 420 of the device 400 to implement the abovementioned method. For example, the non-transitory computer-readable storage medium may be a ROM, a Compact Disc Read-Only Memory (CD-ROM), a magnetic tape, a floppy disc, an optical data storage device and the like.

With the device and the device for charging a lithium ion battery in the present disclosure, in a constant-current charging stage, the lithium ion battery is charged with the multiple sections of constant charging currents which have the current values sequentially decreasing, and the lithium ion battery is left standing or discharged after charging in each section. Then, constant-voltage charging is performed, thereby reducing polarization of the battery, and effectively reducing the constant charging current entering a constant-voltage stage, and further effectively reducing a charging time for the constant-voltage stage. Therefore, the charging time for full charging for the lithium ion battery can be effectively reduced.

With the device and the device for charging a lithium ion battery in the present disclosure, multiple sections of safe charging voltages and charging currents of the pulse for the lithium ion battery are controlled, to effectively reduce a risk of lithium plating of the lithium ion battery, and further improve safety performance and service life of the lithium ion battery.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for charging a lithium ion battery, comprising:

acquiring a polarization attribute of the lithium ion battery, wherein the polarization attribute comprises a maximum charging current under which no lithium plating occurs at an anode of the lithium ion battery;

determining, according to the polarization attribute, a plurality of sections of constant charging currents which have current values decreasing sequentially in a sectional charging sequence;

charging the lithium ion battery in sections with the plurality of sections of constant charging currents respectively, and after charging in each section, leaving the lithium ion battery standing or discharging the lithium ion battery with a preset discharging current less than the maximum charging current; and performing constant-voltage charging with taking a constant-current cut-off voltage as a constant voltage when a voltage of the lithium ion battery reaches the constant-current cut-off voltage.

2. The method of claim 1, wherein the performing constant-voltage charging with taking a constant-current cut-off voltage as a constant voltage when a voltage of the lithium ion battery reaches the constant-current cut-off voltage comprises:

when the voltage of the lithium ion battery reaches the constant-current cut-off voltage, charging the lithium ion battery with taking a charging current obtained when the voltage of the lithium ion battery reaches the constant-current cut-off voltage as an initial charging current for the constant-voltage charging while keeping at the constant-current cut-off voltage, until the charging current for the constant-voltage charging reaches a cut-off current.

3. The method of claim 1, wherein the determining, according to the polarization attribute, a plurality of sections of constant charging currents which have current values decreasing sequentially in a sectional charging sequence comprises:

determining, according to the polarization attribute, the current values of the plurality of sections of constant charging currents which have current values sequentially decreasing in the sectional charging sequence, wherein the current value of a first section of constant charging current in the plurality of sections of constant charging currents for charging the lithium ion battery ranges from 1.1 times to 2.0 times of a current value of the maximum charging current;

determining a plurality of sections of anode lithium plating potentials, having one-to-one correspondences with the current values of the plurality of sections of constant charging currents, of the lithium ion battery based on the current values of the plurality of sections of constant charging currents; and determining a charging time for charging in each section according to the polarization attribute, under a condition that a potential reached by the lithium ion battery during charging in the section is less than the anode lithium plating potential of the section.

4. The method of claim 3, wherein
the current values of the plurality of sections of constant charging currents are determined according to a formula $I_i = A \times I_{i-1}$, where
i represents a serial number for charging the lithium ion battery in sections, i is a natural number greater than 1, $I_i$ represents the current value of an i-th section of constant charging current in the plurality of sections of constant charging currents, a coefficient A is a variable less than 1 and greater than 0.2, and the coefficient A is determined according to the polarization attribute.

5. The method of claim 1, wherein the lithium ion battery comprises a maximum operation voltage, and
the constant-current cut-off voltage is a sum of the maximum operation voltage and an incremental voltage,
the incremental voltage ranges from 0.01V to 0.1V.

6. The method of claim 1, wherein the current values of the plurality of section of constant charging currents decrease sequentially in any one manner of a linear manner, a nonlinear manner or a mathematically monotonic manner.

7. The method of claim 1, wherein a time period for leaving the lithium ion battery standing ranges from 0.1 second to 500 seconds.

8. A device for charging a lithium ion battery, comprising:
a processor;
a memory configured to store an instruction executable by the processor, and
the processor is configured to:
acquire a polarization attribute of the lithium ion battery, wherein the polarization attribute comprises a maximum charging current under which no lithium plating occurs at an anode of the lithium ion battery;

determine, according to the polarization attribute, a plurality of sections of constant charging currents which have current values decreasing sequentially in a sectional charging sequence;

charge the lithium ion battery in sections with the plurality of sections of constant charging currents respectively, and after charging in each section, leave the lithium ion battery standing or discharge the lithium ion battery with a preset discharging current less than the maximum charging current; and perform constant-voltage charging with taking a constant-current cut-off voltage as a constant voltage when a voltage of the lithium ion battery reaches the constant-current cut-off voltage.

9. The device of claim 8, wherein the processor is further configured to:

when the voltage of the lithium ion battery reaches the constant-current cut-off voltage, charge the lithium ion battery with taking a charging current obtained when the voltage of the lithium ion battery reaches the constant-current cut-off voltage as an initial charging current for the constant-voltage charging while keeping at the constant-current cut-off voltage, until the charging current for the constant-voltage charging reaches a cut-off current.

10. The device of claim 8, wherein the processor is further configured to:

determine, according to the polarization attribute, the current values of the plurality of sections of constant charging currents which have current values sequentially decreasing in the sectional charging sequence, wherein the current value of a first section of constant charging current in the plurality of sections of constant charging currents for charging the lithium ion battery ranges from 1.1 times to 2.0 times of a current value of the maximum charging current;

determine a plurality of sections of anode lithium plating potentials, having one-to-one correspondences with the current values of the plurality of sections of constant charging currents, of the lithium ion battery based on the current values of the plurality of sections of constant charging currents; and determine a charging time for charging in each section according to the polarization attribute, under a condition that a potential reached by the lithium ion battery during charging in the section is less than the anode lithium plating potential of the section.

11. The device of claim 10, wherein
the current values of the plurality of sections of constant charging currents are determined according to a formula $I_i = A \times I_{i-1}$, where
i represents a serial number for charging the lithium ion battery in sections, i is a natural number greater than 1,
$I_i$ represents the current value of an i-th section of constant charging current in the plurality of sections of constant charging currents,
a coefficient A is a variable less than 1 and greater than 0.2, and the coefficient A is determined according to the polarization attribute.

12. The device of claim 8, wherein the lithium ion battery comprises a maximum operation voltage, and
the constant-current cut-off voltage is a sum of the maximum operation voltage and an incremental voltage,
the incremental voltage ranges from 0.01V to 0.1V.

13. The device of claim 8, wherein the current values of the plurality of section of constant charging currents decrease sequentially in any one manner of a linear manner, a nonlinear manner or a mathematically monotonic manner.

14. The device of claim 8, wherein a time period for leaving the lithium ion battery standing ranges from 0.1 second to 500 seconds.

15. A non-transitory computer-readable storage medium, having a computer-executable instruction stored thereon for execution by a processor to implement a method for charging a lithium ion battery, the method comprising:
acquiring a polarization attribute of the lithium ion battery, wherein the polarization attribute comprises a maximum charging current under which no lithium plating occurs at an anode of the lithium ion battery;
determining, according to the polarization attribute, a plurality of sections of constant charging currents which have current values decreasing sequentially in a sectional charging sequence;
charging the lithium ion battery in sections with the plurality of sections of constant charging currents respectively, and after charging in each section, leaving the lithium ion battery standing or discharging the lithium ion battery with a preset discharging current less than the maximum charging current; and
performing constant-voltage charging with taking a constant-current cut-off voltage as a constant voltage when a voltage of the lithium ion battery reaches the constant-current cut-off voltage.

16. The non-transitory computer-readable storage medium of claim 15, wherein the performing constant-voltage charging with taking a constant-current cut-off voltage as a constant voltage when a voltage of the lithium ion battery reaches the constant-current cut-off voltage comprises:

when the voltage of the lithium ion battery reaches the constant-current cut-off voltage, charging the lithium ion battery with taking a charging current obtained when the voltage of the lithium ion battery reaches the constant-current cut-off voltage as an initial charging current for the constant-voltage charging while keeping at the constant-current cut-off voltage, until the charging current for the constant-voltage charging reaches a cut-off current.

17. The non-transitory computer-readable storage medium of claim 15, wherein the determining, according to the polarization attribute, a plurality of sections of constant charging currents which have current values decreasing sequentially in a sectional charging sequence comprises:
determining, according to the polarization attribute, the current values of the plurality of sections of constant charging currents which have current values sequentially decreasing in the sectional charging sequence, wherein the current value of a first section of constant charging current in the plurality of sections of constant charging currents for charging the lithium ion battery ranges from 1.1 times to 2.0 times of a current value of the maximum charging current;
determining a plurality of sections of anode lithium plating potentials, having one-to-one correspondences with the current values of the plurality of sections of constant charging currents, of the lithium ion battery based on the current values of the plurality of sections of constant charging currents; and
determining a charging time for charging in each section according to the polarization attribute, under a condition that a potential reached by the lithium ion battery during charging in the section is less than the anode lithium plating potential of the section.

18. The non-transitory computer-readable storage medium of claim 17, wherein
the current values of the plurality of sections of constant charging currents are determined according to a formula $I_i = A \times I_{i-1}$, where
i represents a serial number for charging the lithium ion battery in sections, i is a natural number greater than 1,
$I_i$ represents the current value of an i-th section of constant charging current in the plurality of sections of constant charging currents,
a coefficient A is a variable less than 1 and greater than 0.2, and the coefficient A is determined according to the polarization attribute.

19. The non-transitory computer-readable storage medium of claim 15, wherein the lithium ion battery comprises a maximum operation voltage, and
the constant-current cut-off voltage is a sum of the maximum operation voltage and an incremental voltage,
the incremental voltage ranges from 0.01V to 0.1V.

20. The non-transitory computer-readable storage medium of claim 15, wherein the current values of the plurality of section of constant charging currents decrease sequentially in any one manner of a linear manner, a nonlinear manner or a mathematically monotonic manner.

* * * * *